(No Model.)
C. E. BALL.
DYNAMO ELECTRIC MACHINE.
No. 291,973. Patented Jan. 15, 1884.
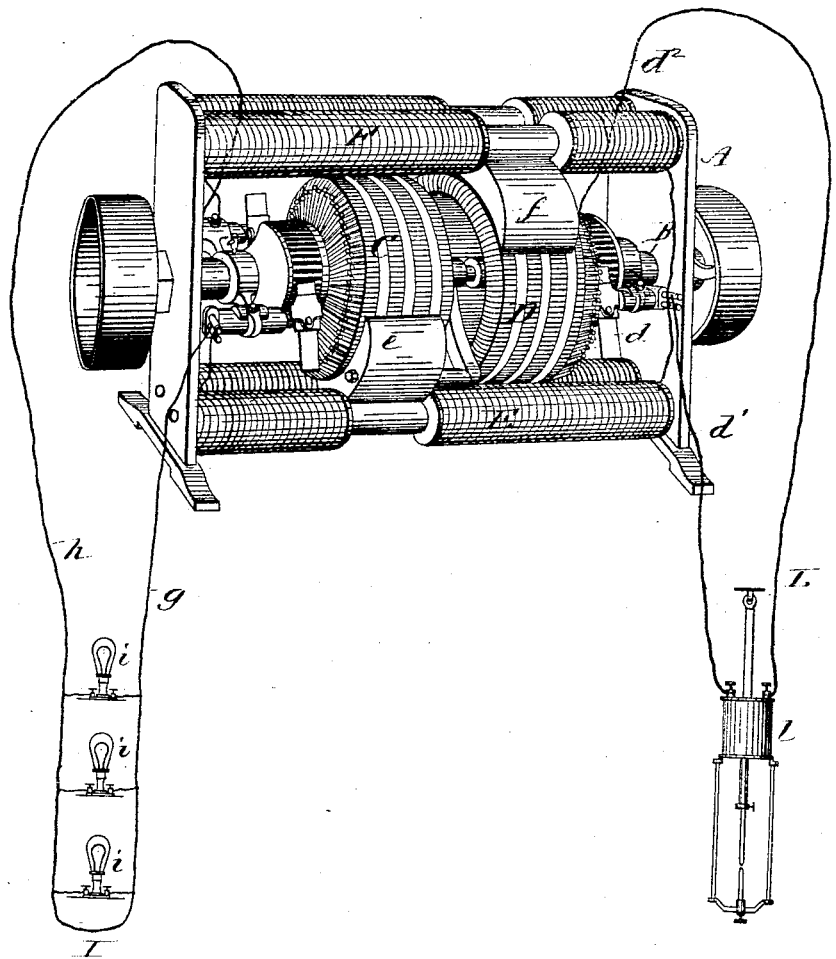
WITNESSES:
Will H Powell
A. A. Connolly
Chas. E. Ball
INVENTOR
by Connolly Bros
ATTORNEYS

UNITED STATES PATENT OFFICE.

CHARLES E. BALL, OF PHILADELPHIA, PENNSYLVANIA.

DYNAMO-ELECTRIC MACHINE.

SPECIFICATION forming part of Letters Patent No. 291,972, dated January 15, 1884.

Application filed October 9, 1883. (No model.)

*To all whom it may concern:*

Be it known that I, CHARLES E. BALL, a citizen of the United States, residing at Philadelphia, in the county of Philadelphia and State of Pennsylvania, have invented certain new and useful Improvements in Dynamo-Electric Machines; and I do hereby declare the following to be a full, clear, and exact description of the invention, reference being had to the accompanying drawing, which forms part of this specification, in which the figure is a perspective of my invention.

My invention has for its object to provide a dynamo-electric machine capable of generating and supplying at one and the same time currents of electricity of quantity and of intensity—the former for incandescent lamps, the latter for arc-lights—whereby two circuits—one comprising incandescent lamps and the other arc-lights—may be provided with electrical currents of different characters from a single machine.

My invention consists, essentially, in the combination, in a dynamo-electric machine, of two armatures, one wound for quantity and the other for intensity, the former being in circuit with the field of both, and having also an external circuit for incandescing lamps, and the latter having connections for an external circuit comprising arc-lights.

My invention consists still further in the combination, with a dynamo-electric machine having two armatures—one of which is in circuit with the field, the other not—of two external circuits, one of which includes incandescent lamps, the other arc-lights.

My invention consists still further in certain details of construction and combination, relating particularly to the combination, with a dynamo-electric machine having two pole-pieces, of two armatures, each located and adapted to be rotated in the inductive field of only one pole, one of said armatures being wound for quantity and the other for intensity, said quantity-armature being in circuit with the field, while the intensity-armature is not, substantially as hereinafter fully set forth.

Referring to the accompanying drawing, A represents a dynamo-electric machine having a shaft, B, on which are located two armatures, C and D, respectively, and which has magnet-bars E and F on opposite sides of the machine, with pole-pieces $e f$. The armatures are preferably of ring form, though any other known or equivalent style of armature may be substituted therefor. The armature C is wound for quantity, is in circuit with the field-magnet, and has connections $g h$ for an external circuit, I, which includes incandescent lamps $i i$, &c. The armature D is wound for intensity, and has its own commutators $d d$, with connections $d' d^2$ for an external circuit, L, which includes arc-lamps $l$. As illustrated, each of the armatures is located and adapted to be rotated within the inductive field of only one pole of a magnet, and both armatures are on one and the same shaft; but, if desired, there may be two or more poles for each armature, and the latter may be mounted on separate shafts. In every case, however, the quantity-armature will be in circuit with the field and the intensity-armature not in such circuit, though energized by induction therefrom.

The special advantage of the construction herein set forth is that from a single machine two circuits of unlike character may be supplied with electrical currents specially suited to each, thus permitting the use of both incandescent lamps and arc-lights without requiring a separate generator for each.

It is well known that a quantity-current is better adapted for energizing the field-magnets of a dynamo-electric machine than an intensity-current, and for this reason I arrange the circuits of my machine so that the field-magnets will be in circuit with the quantity-armature. By this means I obtain sufficient magnetism to strongly energize the intensity-armature, which is in an isolated arc-lamp circuit.

A further advantage of this arrangement is that as the arc-lamps are not in circuit with the field-magnets their tendency to interrupt the steadiness of the current does not affect the latter, and it becomes possible to maintain the incandescent circuit in a perfectly even and steady condition.

What I claim as my invention is as follows:

1. The combination, in a dynamo-electric machine, of two armatures, one of which is wound for quantity and the other for intensity, the quantity-armature being in circuit with the field, the intensity-armature not being in circuit with such field, though designed and adapted to be energized inductively thereby, substantially as set forth.

2. The combination, with a dynamo-electric machine having two armatures, one of which is wound for quantity and the other for intensity, the former being in circuit with the field and the latter not in such circuit, of two external circuits, which include, respectively, incandescent lamps and arc-lights, the former embracing the quantity-armature and the latter the intensity-armature, substantially as set forth.

3. A dynamo-electric machine having two field-poles and two armatures, each of which is located and adapted to be rotated in the field of force of only one of said poles, one of said armatures being wound for quantity and the other for intensity, the quantity-armature being in circuit with the field and having connections for an external incandescent circuit, and the intensity-armature not being in circuit with the field, but having connections for an external arc-circuit, substantially as set forth.

In testimony that I claim the foregoing I have hereunto set my hand this 24th day of September, 1883.

CHAS. E. BALL.

Witnesses:
ANDREW ZANE, Jr.,
M. D. CONNOLLY.